March 8, 1927.　　　　F. McELHANEY　　　　1,620,368
　　　　　　　　　　　　　AEROPLANE
　　　　　　　　　　Filed June 12, 1926　　　4 Sheets-Sheet 1
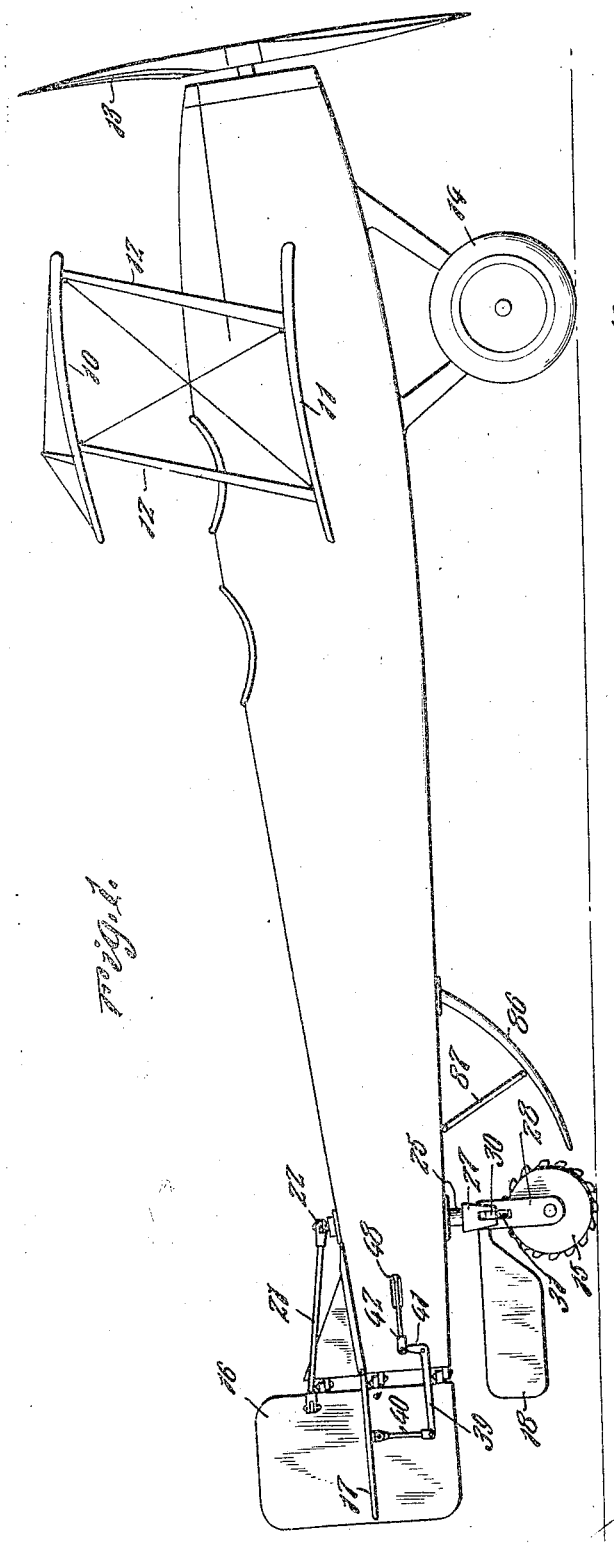
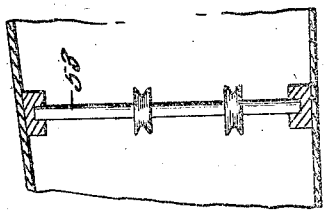
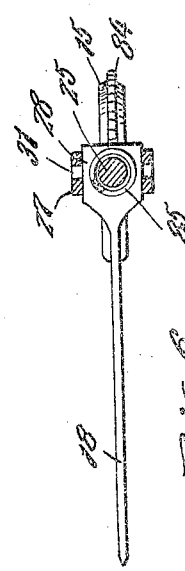
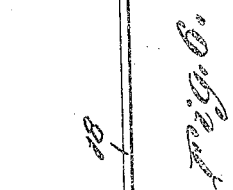
Frank McElhaney
INVENTOR
BY Victor J. Evans
ATTORNEY

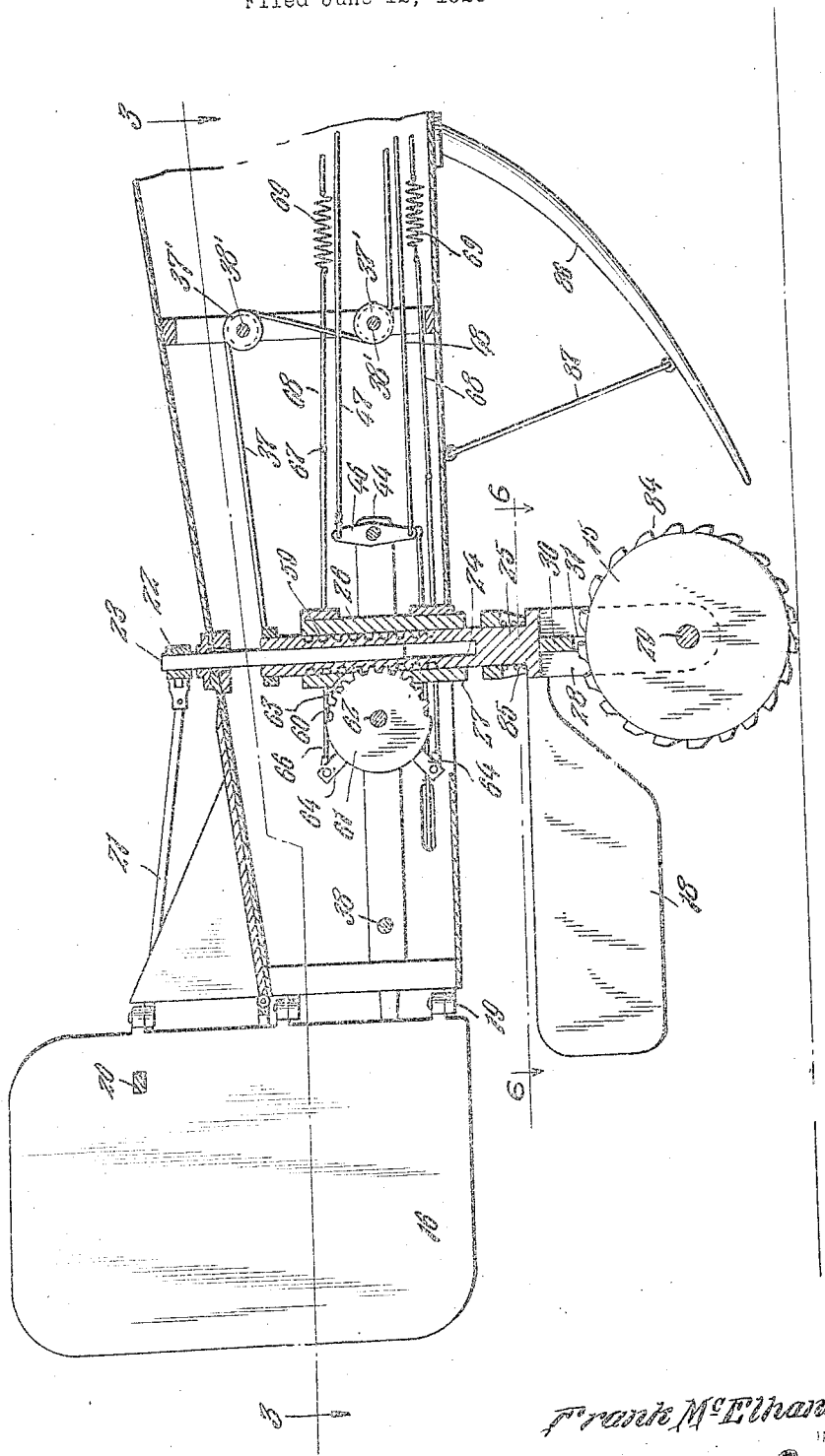

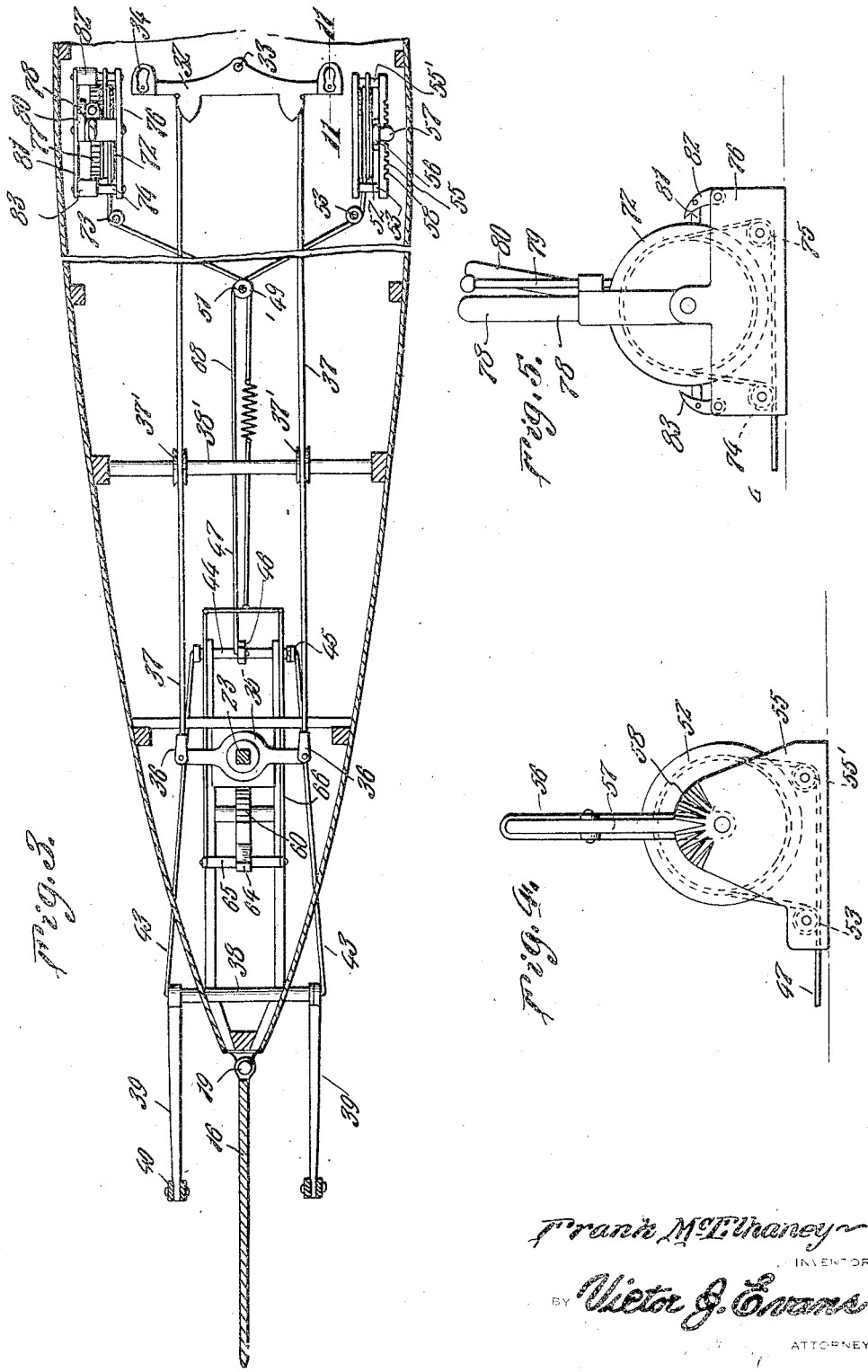

March 8, 1927.
F. McELHANEY
AEROPLANE
Filed June 12, 1926 4 Sheets-Sheet 4
1,620,368
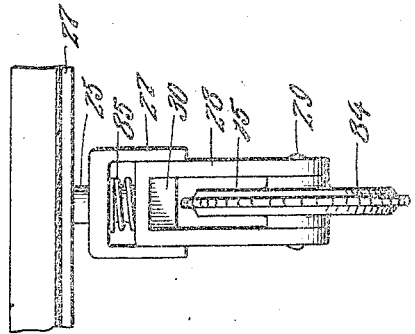
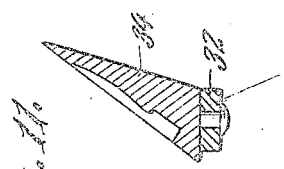
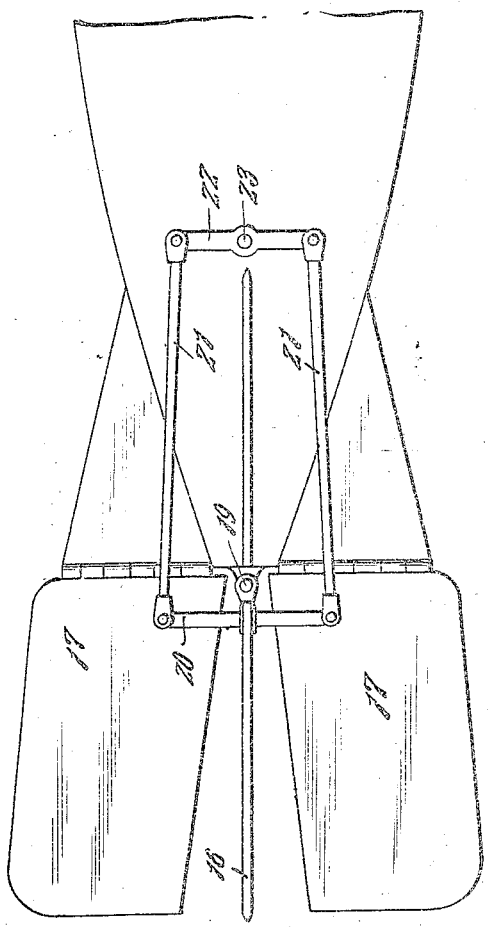
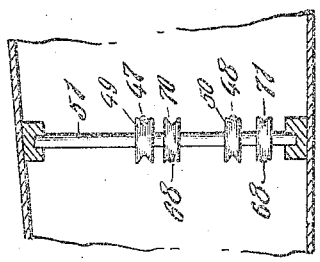
Frank McElhaney
INVENTOR
BY Victor J. Evans
ATTORNEY Patented Mar. 8, 1927.

1,620,368

UNITED STATES PATENT OFFICE.

FRANK McELHANEY, OF MORGANTOWN, WEST VIRGINIA.

AEROPLANE.

Application filed June 12, 1926. Serial No. 115,575.

This invention relates to aeroplanes, and contemplates certain improvements in the construction disclosed in Patent No. 1,576,342, issued to me on March 9, 1926.

In carrying out the present invention I contemplate the provision of foot actuated means for controlling the adjustment of the vertical rudder and the landing wheel of the machine which is also utilized for guiding the latter when moving over the ground.

Another important object of the invention resides in the provision of means for locking the said landing wheel against rotation, and constructing said wheel to permit of its use in the capacity of a drag or skid, without interfering with the turning of the wheel for the purpose of steering the machine when landing.

Another object of the invention resides in the provision of means for adjusting the said wheel vertically with relation to the machine, and incorporating in such structure shock absorbing elements which allows the wheel to be used as a drag or skid.

A further object of the invention resides in arranging a guard in advance of the said wheel to protect the latter from coming in contact with stationary objects which would otherwise damage the wheel.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a side elevation of the machine.

Figure 2 is an enlarged fragmentary longitudinal sectional view showing the means for raising and lowering the landing wheel and the locking means therefor, together with the relative position of the guard for said wheel.

Figure 3 is a sectional view taken on line 3—3 of Figure 2 looking in the direction of the arrows.

Figure 4 is a detail view of the control means for the horizontal rudder.

Figure 5 is a similar view of the control for the means for raising and lowering the landing wheel shown in Figure 2.

Figure 6 is a sectional view on line 6—6 of Figure 2.

Figure 7 is a fragmentary plan view.

Figure 8 is a front view of landing wheel and mounting therefor.

Figure 9 is a view showing the arrangement of guide pulleys for the controlling elements.

Figure 10 is a similar view of the guide pulleys for the controlling elements for each drum.

Figure 11 is a section on line 11—11 of Figure 3.

Referring to the drawings in detail 10 and 11 indicate respectively the upper and lower planes of the machine which are connected together by uprights 12. The propeller 13 is arranged and operated in the ordinary well known manner. The front ground wheels are indicated at 14 and supported in any suitable manner, while the rear ground or landing wheel is relatively small and indicated at 15. The vertical rudder is indicated at 16 and the horizontal rudder at 17, while projecting rearwardly from the support for the rear wheel 15 is an additional small rudder 18.

The vertical rudder is pivoted adjacent its lower end as at 19, while supported adjacent the upper end thereof is a transverse bar 20 which has connected to the opposite ends thereof forwardly projecting rods 21. The corresponding forward extremities of these rods are connected to a cross bar 22 keyed or otherwise suitably secured to a stem 23. A portion of this stem is angular in cross section to slide in a bore 24 of similar contour, this bore being provided in a shaft 25. This shaft is also mounted for sliding movement through a suitable boxing 26 to allow the small landing wheel 15 to be adjusted vertically in a manner to be hereinafter described. Arranged beneath the boxing 26 is an inverted U-shaped member 27 having an opening to receive the shaft 25, which projects through the member 27 and has fixed to the lower end thereof in any suitable manner a fork-shaped member 28 between the parallel limbs of which the wheel 15 is journaled as at 29. The sides of the inverted U-shaped member 27 are slotted to receive a transverse locking bar 30 which is secured to the member 27 in any suitable manner and arranged directly above the periphery of the small landing wheel 15. The parallel limbs of the fork-shaped member 28 are also slotted as at 31 to receive the locking bar for a purpose to be hereinafter described. Consequently when the shaft 26 is turned in either direction, the vertical propeller is adjusted, and the wheel 15 simultaneously turned to guide the machine when moving over the ground or surface.

In accordance with the present invention I contemplate the provision of a foot actuated means for controlling the movements of the shaft 26 for the purpose just mentioned, and this means includes a transverse plate 32 arranged at the forward end of the machine and pivoted at a point between its ends as at 33. Pedals or foot engaging members 34 rise from the ends of this plate, so that the latter can be readily and conveniently shifted in either direction to control the adjustment of the vertical rudder. These pedals are mounted for pivotal movement with relation to the plate 32. Carried by the squared portion of the stem 23 is a cross bar 35, from the opposed ends of which extend pivoted links 36 which are connected with the adjacent ends of wires or cables 37, the corresponding forward extremities of these elements being connected with the plate 32. Therefore when the plate is shifted in either direction upon its pivot 33, a pull is exerted upon one or the other wires or cables 37 to turn the stem 23, which by reason of its association with the shaft 26 also turns the latter in the same direction. The cables 37 are trained over and under suitable guide pulleys 37' which are arranged on spaced superimposed shafts 38' as clearly shown. The vertical rudder is turned by reason of its connection with the stem 23, while the small landing wheel 15 is turned with the shaft 26.

Journaled transversely of the machine is a shaft 38, and carried by the opposite ends of this shaft are bell crank levers or the like, the corresponding branches 39 of which are connected to vertically disposed rods 40 which are pivotally connected to the under side of the horizontal rudder 17. Projecting forwardly from the vertical branches 41 of the bell crank levers or the like are links 42, and these links are connected with the adjacent ends of wires or cables 43 which are selectively actuated to control the movements of the horizontal rudder. It might be stated that the vertical branch of one of the bell crank levers extends upwardly above the shaft, while the corresponding branch of the other lever depends from the shaft. Arranged in advance of the shaft 38 parallel therewith is a rock shaft 44 which has secured to the ends thereof reversely disposed arms 45, one of these arms projecting above the shaft and the other below the shaft. These arms are connected with the corresponding forward extremities of the wire or cables 43, so that the shaft 44 is rocked in one or the other directions depending upon the direction of movement desired to be imparted to the horizontal rudder 17. Carried by the shaft 44 between the ends thereof is a link 46, the latter being vertically disposed, and having its ends connected with operating wires or cables 47 and 48 respectively as clearly illustrated in Figure 2. These cables are trained about spaced guide pulleys 49 and 50 respectively which are carried by a vertically disposed shaft 51, and extend in the direction of the drum 52. The cables 47 and 48 are also trained over suitable guide pulleys 53 arranged directly in advance of the drum 52, and also pass under spaced rollers 53 and 54 journaled in the base or support 55 upon which the drum is journaled. The cables are associated with the drums to be alternately wound about and unwound from said drum, so that the cables are singly utilized to shift or control the horizontal rudder 17. The drum is actuated by a suitable lever 56 which has associated therewith a pivoted pawl 57 to cooperate with the teeth 58 provided on the support 55 for the drum, so that the drum may be held against rotation with the horizontal rudder in a given position.

As hereinbefore stated, the small landing wheel 15 is mounted for vertical adjustment, and for this purpose I provide the shaft 26 with spaced flanges 59 which in reality provides a rack for engagement by the teeth 60 of a gear 61 journaled upon a suitable shaft 62. Only a portion of the periphery of this gear is toothed as illustrated, and this portion of the gear operates in a suitable opening or slot 63 formed in the boxing 26, to allow the gear to mesh with the shaft 26. Radiating from the gear are arms 64, each of which is provided with a cross head 65. Connected to the ends of each cross head are wires 66. Each pair of wires is connected at a point 67 with a wire 68, there being obviously two of such control wires 68 which are singly used to effect a vertical adjustment of the shaft 26 with the wheel 15. Each of these control wires 68 has included in its length a strong coil spring 69 for a purpose to be hereinafter described, while the control wires 68 are trained over suitable pulleys 70 and 71 respectively which are carried on the same shaft 51 that supports the guide pulleys 49 and 50 for the other control wires for the horizontal rudder hereinabove mentioned. The control wires 68 for the gear 61 are then extended in the direction of the drum 72, being passed over suitable guide pulleys 73 arranged directly in advance of the drum, and also under rollers 74 and 75 journaled on the base or support 76 for said drum. The wires 68 are associated with the drum to be alternately wound about and unwound therefrom, so that only one wire at a time is employed to operate the gear 61 in the proper direction. Carried by the shaft of the drum is a toothed wheel 77 above which the lever 78 operates, and this lever is provided with a movable pawl 79 normally spaced from the teeth of the wheel 77, but adapted to be moved into engagement therewith to turn the latter and said drum in either direction, depending upon the direction of movement of the lever 78. Also pivotally mounted adjacent the drum is a lever 80 which operates a sliding bar 81, the latter having pivoted thereon locking dogs 82 and 83 respectively, arranged to singly engage the toothed wheel 77, to hold the latter against retrograde movement in either direction, after the lever 78 has been employed to adjust the gear 61. Manifestly when the gear 61 is rotated in one direction the shaft 26 is elevated to move the ground engaging wheel 15 closer to the machine, and when the gear 61 is turned in the other direction the shaft and ground engaging wheel are lowered or moved in a direction away from the machine.

As hereinabove pointed out, the small ground engaging wheel is adapted to be utilized as a brake, drag or skid for the machine when landing, and for this purpose the periphery of the wheel is toothed or notched as at 84 for use in conjunction with the locking bar 30 hereinabove described. Now, when the pilot is about to land his machine, he operates the lever 78 to move the shaft 26 vertically, and when the inverted U-shaped member 27 strikes against the bottom of the boxing 26, a continued movement of the lever 78 in the same direction moves the wheel 15 together with its forked support 28 in the direction of the machine. The forked member 28 moves upwardly within the U-shaped member, but against the tension of a spring 85 which surrounds the shaft 25 and interposed between the U-shaped member 27 and the forked support 28 for the wheel. During this movement of the fork-shaped member, the wheel is brought into engagement with the locking bar 30, the latter being received by one of the notches 84, to hold the wheel against rotation when the machine strikes the ground, thereby allowing this wheel to be used in the capacity of a brake. The springs 69 arranged in the length of the operating cables 68 allow this adjustment to take place without placing the mechanism under undue strain, and preventing breakage of any of the parts, it of course being understood that the wheel and shaft are all locked against vertical movement by means of one of the locking dogs and its association with the toothed wheel 77 above described. When it is desired to release the wheel 15 for rotation, it is only necessary to operate the lever 80 to disengage the particular dog employed from the toothed wheel 77, whereupon the spring 85 assists the lever 78 in sliding the shaft 25 downwardly, to separate the wheel from the locking bar 30.

Depending from the machine is a curved guard 86 which is suitably braced at a point between its ends by means of a bracing element 87 as clearly illustrated in Figure 1, and this guard is arranged directly in advance of the wheel 15 to protect the latter from catching on to anything, or brought into engagement with stationary objects that would possibly injure the wheel.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In an aeroplane, a body portion, planes mounted thereon, propelling mechanism, a vertical shaft mounted for rotatable and vertical movement, a stem rotatable with the shaft and slidable vertically with relation thereto, a rudder carried by the stem and means for shifting the rudder and shaft simultaneously, a ground engaging wheel carried by said shaft, means for adjusting the shaft vertically independently of said rudder and holding said shaft in a given vertical position, means disposed in the path of vertical movement of the wheel and cooperating therewith to hold the wheel against rotation, whereby the latter serves as a brake or skid, a horizontal rudder, and means for controlling the movements of the latter.

2. In an aeroplane, a body portion, planes mounted thereon, propelling mechanism, a vertical shaft mounted for rotatable and vertical movement, a stem rotatable with the shaft and with reference to which said shaft is movable vertically, a rudder carried by the stem, a ground engaging wheel carried by the shaft, means for adjusting the shaft and wheel vertically and holding the shaft in a given vertical position, a locking bar arranged transversely of the wheel and in the path of movement of the latter, cooperating means carried by the wheel for interlocking engagement with said bar when the wheel is moved to the limit of its vertical adjustment, whereby the wheel is held against rotation to serve as a skid, a horizontal rudder, and means for controlling the movements of the latter.

3. In an aeroplane, a body portion, planes mounted thereon, propelling mechanism, a vertical shaft mounted for rotatable and vertical movement, a stem rotatable with the shaft and with reference to which the shaft is vertically movable, a vertical rudder carried by the stem, foot controlled means for simultaneously shifting the shaft and rudder, means for adjusting the shaft vertically, a landing wheel carried by the lower end of the shaft and having notches in the periphery thereof, a locking bar arranged above and transversely of said wheel and adapted to engage the latter upon the limit of its upward adjustment, to prevent rotation of the wheel, whereby the latter serves as a skid, means for locking the shaft in a given vertical position, an additional rudder projecting rearwardly of the wheel and arranged beneath the vertical rudder, a horizontal rudder, and means for controlling the movements of the latter.

4. In an aeroplane, a vertical shaft mounted for rotatable and vertical movements, a vertical rudder operated by said shaft, means for rotating said shaft, a ground engaging wheel carried by the lower end of the shaft, spaced flanges formed on the shaft, a gear meshing with said flanges, means for rocking said gear to adjust said shaft vertically, means for locking said gear in a given position, means disposed in the path of vertical movement of said wheel to engage and hold the latter against rotation, whereby said wheel serves as a skid in an adjusted position, resilient means interposed between the shaft and wheel and against which the wheel is locked in an adjusted position, a horizontal rudder, and means for controlling said rudder independently of the vertical rudder.

5. In an aeroplane, a vertical shaft mounted for both rotatable and sliding movement, a rudder operated by said shaft, engaging means on the shaft, a gear having a segmental toothed portion meshing with the engaging means for elevating the shaft, means for operating said gear, a landing wheel carried by the lower end of the shaft, and means for automatically locking the wheel against rotation when adjusted with the shaft to a predetermined position, and means for locking the shaft in its given position.

In testimony whereof I affix my signature.

FRANK McELHANEY.